United States Patent [19]

Mientek

[11] Patent Number: 4,514,475

[45] Date of Patent: Apr. 30, 1985

[54] FUEL CELL SEPARATOR WITH COMPRESSIBLE SEALING FLANGES

[75] Inventor: Anthony P. Mientek, Glastonbury, Conn.

[73] Assignee: The United States of America as represented by the United States Department of Energy, Washington, D.C.

[21] Appl. No.: 595,012

[22] Filed: Mar. 30, 1984

[51] Int. Cl.$^3$ .............................................. H01M 8/02
[52] U.S. Cl. ......................................... 429/35; 429/37
[58] Field of Search .................................... 429/35, 37

[56] References Cited

U.S. PATENT DOCUMENTS

| | | | |
|---|---|---|---|
| 3,282,734 | 11/1966 | Rzewinski | 429/35 |
| 3,607,418 | 9/1971 | Ortieb et al. | 429/35 |
| 4,345,009 | 8/1982 | Fahle et al. | 429/37 |
| 4,450,212 | 5/1984 | Feigenbaum et al. | 429/35 |

*Primary Examiner*—Donald L. Walton
*Attorney, Agent, or Firm*—Hugh W. Glenn; Robert J. Fisher; Judson R. Hightower

[57] ABSTRACT

A separator for separating adjacent fuel cells in a stack of such cells includes a flat, rectangular, gas-impermeable plate disposed between adjacent cells and having two opposite side margins thereof folded back over one side of the plate to form two first seal flanges and having the other side margins thereof folded back over the opposite side of the plate to form two second seal flanges, each of the seal flanges cooperating with the plate to define a channel in which is disposed a resiliently compressible stack of thin metal sheets. The two first seal flanges cooperate with the electrolyte matrix of one of the cells to form a gas-impermeable seal between an electrode of the one cell and one of two reactant gas manifolds. The second seal flanges cooperate with the electrolyte matrix of the other cell for forming a gas-impermeable seal between an electrode of the other cell and the other of the two reactant gas manifolds. The seal flanges cooperate with the associated compressible stacks of sheets for maintaining a spacing between the plate and the electrolyte matrices while accommodating variation of that spacing.

20 Claims, 6 Drawing Figures

4,514,475

FUEL CELL SEPARATOR WITH COMPRESSIBLE SEALING FLANGES

CONTRACTUAL ORIGIN OF THE INVENTION

The United States Government has rights in this invention pursuant to Contract No. DE-AC01-79ET15440 between the U.S. Department of Energy and United Technologies Power Systems.

BACKGROUND OF THE INVENTION

The present invention relates to fuel cells and particularly molten carbonate fuel cells. More specifically, the present invention relates to separators for separating adjacent cells in a stack of fuel cells in a molten carbonate fuel cell power plant.

One type of molten carbonate fuel cell comprises an anode electrode spaced apart from a cathode electrode by an electrolyte-retaining matrix. Each electrode is disposed in a reaction region of the cell which is separated from adjacent cells by a separator plate. A corrugated support occupies the space between each electrode and the adjacent separator plate. The corrugations on the two supports are disposed at right angles to each other and respectively permit passage of two different reactant gases in perpendicular directions through the two reactive areas. The passages of one of the supports extend between gas manifolds on opposite sides of the stack of cells for one of the reactant gases, while the passages of the other support extend between gas manifolds on the other to sides of the stack for the other reactant gas.

Each separator plate carries along the opposite side edges thereof two solid metal sealing rails which extend parallel to the support passages and the associated reactive area and toward one end of the stacks of cells, these rails being approximately the same height as the electrode and its support in the associated reactive area of the cell. Similar rails are formed along the other side edges of the separator plate and project toward the other end of the stack of cells or sealing a reactive area of an adjacent cell. Thus, each cell is bounded by two separator plates, the seal rails on one separator plate sealing one of the cell's active areas and the seal rails on the other separator plate sealing the other of the cells' active areas.

The disadvantage of the solid sealing rails is that they cannot adjust to changes in the thickness of the electrodes and the electrode supports. These changes in thickness may result from manufacturing tolerances in the several parts of the cell or from characteristics exhibited by the cell parts in response to operation of the cell. Thus, for example, when the stack of cells is heated, the electrodes and supports undergo thermal expansion, increasing the compressive forces thereon. Over time, the parts of the cell undergo creep which tends to lessen the compressive forces and may cause parts to pull away from the sealing rails and impair the sealing of the active cell areas. Electrical and thermal conductivity between cell components and between adjacent cells may also be impaired.

SUMMARY OF THE INVENTION

It is a general object of the present invention to provide an improved fuel cell separator which avoids the disadvantages of prior separators while affording additional structural and operating advantages.

An important object of this invention is the provision of a fuel cell separator which can adjust to changes in the thickness of the cell parts during use.

In connection with the foregoing objects, it is another object of this invention to provide an improved fuel cell separator of the type set forth which is resiliently compressible.

Still another object of this invention is the provision of a fuel cell separator of the type set forth which is of simple and economical construction.

These and other objects of the invention are attained by providing a fuel cell separator for separating two adjacent fuel cells in a stack of such cells, the separator comprising: a substantially flat, gas-impermeable plate disposed between the adjacent cells; and resiliently compressible, gas-impermeable seal means along a peripheral edge of the plate projecting therefrom toward one end of the stack, the seal means cooperating with the plate and with one of the adjacent cells for providing a gas-impermeable seal for a portion of the one cell along the peripheral edge, the seal means cooperating with the plate for maintaining a spacing between portions of the adjacent cells while the compressibility of the seal means accommodates variation of the spacing.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

DESCRIPTION OF THE FIGURES

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
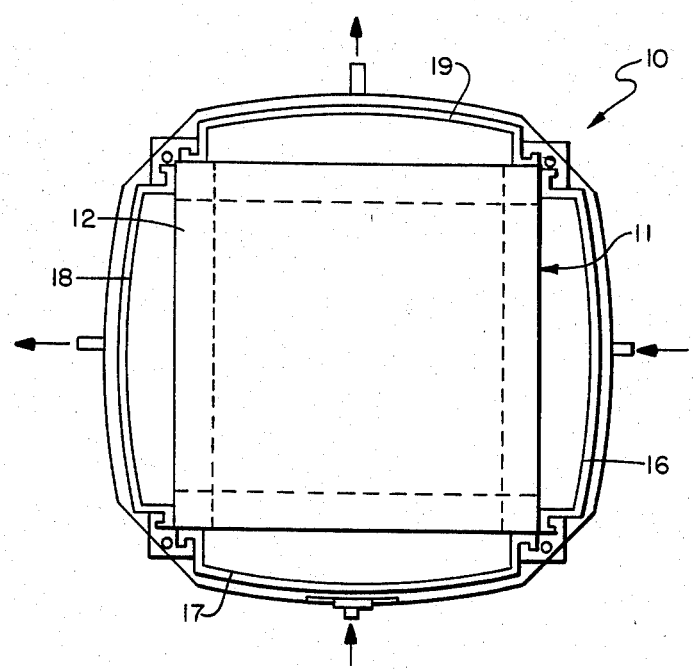
FIG. 1 is a top plan view of a fuel cell module comprising a stack of fuel cells separated by separator plates constructed in accordance with and embodying the features of the present invention.
Figure 2:
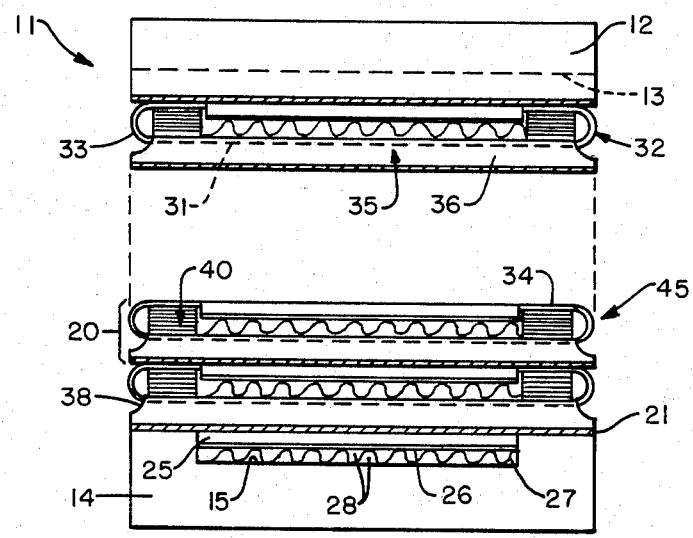
FIG. 2 is a front elevational view of the fuel cell stack of FIG. 1, with a portion of the stack removed.
Figure 4:
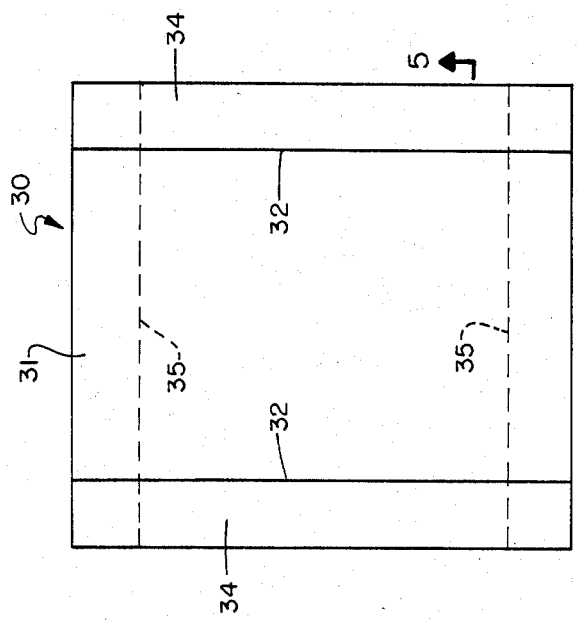
FIG. 4 is a top plan view of a separator plate constructed in accordance with and embodying the features of the present invention.
Figure 3:
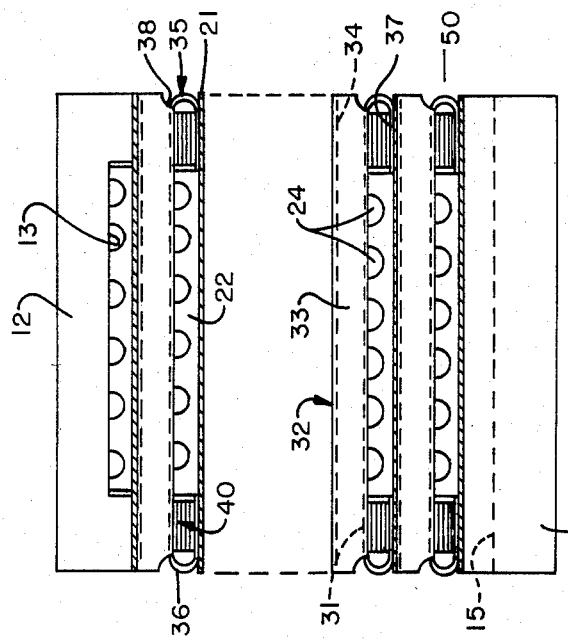
FIG. 3 is a side elevational view of the fuel cell stack of FIG. 2, as viewed from the right-hand side thereof.

In FIG. 1 there is illustrated a fuel cell module, generally designated by the numeral 10, which includes a stack 11 of fuel cells. Referring also to FIGS. 2, 3, and 4 of the drawings, the stack 11 comprises a plurality of identical repeating fuel cell units, each generally designated by the numeral 20, which may be of the molten carbonate type. The stack 11 is bounded at the top by an anode end plate 12 having a rectangular channel 13 formed on the bottom surface thereof and extending thereacross, and is bounded at the bottom by a cathode end plate 14 which is provided in the upper surface thereof with a rectangular channel 15 extending thereacross in a direction perpendicular to the direction of the channel 13. The end plates 12 and 14 and the fuel cell units 20 are rectangular in shape, being illustrated as substantially square in the drawings. Thus, the stack 11 comprises a column of square transverse cross section having four rectangular vertical side faces which are respectively substantially completely covered by reactant gas manifolds, including a fuel inlet manifold 16, an oxidant inlet manifold 17, a fuel outlet manifold 18 and an oxidant outlet manifold 19.

Each fuel cell unit 20 includes a flat, rectangular electrolyte matrix 21 having the upper surface thereof disposed in contact with an anode 22, which is preferably in the form of a flat plate or block having a thickness substantially greater than that of the matrix 21 and provided in the upper surface thereof with a plurality of substantially equidistantly spaced-apart parallel channels 24, each of the channels 24 being part-cylindrical in transverse cross section and extending across the stack 11 from the fuel inlet manifold 16 to the fuel outlet manifold 18. At the top of the stack 11 an electrolyte matrix 21 is disposed in contact with the bottom surface of the anode end plate 12, the associated anode 22 for that top electrolyte matrix 21 being disposed in the channel 13 in the anode end plate 12 (see FIG. 3) substantially coterminous therewith, and with the channels 24 running parallel to the long dimension of the channel 13. Disposed in contact with the bottom surface of each electrolyte matrix 21 is a flat, rectangular cathode 25, the bottom surface of which is disposed in contact with a thin rectangular support plate 26. The cathode support plate 26 is in turn mounted on a corrugated current collector 27, the corrugation of which run laterally thereacross to define a plurality of channels 28 which extend in use from the oxidant inlet manifold 17 to the oxidant outlet manifold 19 (see FIG. 1). At the bottom of the stack 11 an electrolyte matrix 21 is disposed in contact with the upper surface of the cathode end plate 14, the associated cathode assembly including cathode 25, cathode support plate 26 and current collector 27, being disposed in the channel 15 in the upper surface of the cathode end plate 14 substantially coterminous therewith, and with the channels 28 running parallel to the long dimension of the channel 15.

It will be noted that the dimension of each anode 22 transversely of the channels 24 is substantially less than the corresponding dimension of the associated matrix 21. The projecting margins of each matrix 21 in this direction define seal areas thereof along the opposite closed sides of the anode 22. In like manner, the dimensions of the cathodes 25, cathode support plates 26 and current collectors 27 transversely of the corrugation channels 28 in the cathode support plate 26 are substantially less than the same as the corresponding dimension of the associated electrolyte matrix 21. The projecting margins of each matrix 21 in this direction define seal areas thereof along the opposite closed sides of the associated cathode 25.

Figure 5:
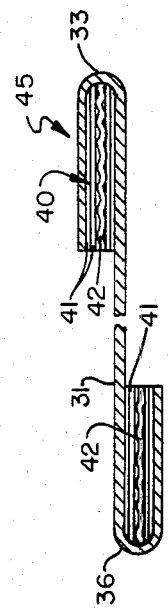
FIG. 5 is an enlarged view in vertical section taken along the line 5—5 in FIG. 4.

Referring now also to FIGS. 4 and 5 of the drawings, adjacent ones of the repeating fuel cell units 20 are separated by a separator, generally designated by the numeral 30, constructed in accordance with and embodying the features of the present invention. The separator 30 includes a flat rectangular metal plate 31 of substantially the same plan dimensions as each of the fuel cell units 20. The plate 31 is provided respectively along opposite side edges thereof with substantially identical cathode sealing flanges 32, each of which comprises a unitary margin of the plate 31 folded back upon itself. Each of the cathode sealing flanges 32 has an arcuate end portion 33 and a flat portion 34 which overlaps the plate 31 and is spaced a predetermined distance thereabove. Similarly, the other two side edges of the plate 31 are respectively provided with substantially identical anode sealing flanges 35, each of which comprises a unitary margin of the plate 31 folded downwardly and back upon itself. Each of the anode sealing flanges 35 has an arcuate end portion 36 and a flat portion 37 which overlaps the plate 31 and is spaced a predetermined distance therebelow. The separator 30 is provided with corner cutouts 38 at the junctions of each of the flanges 32 and 35 with the plate 31 to facilitate the folding thereof during the fabrication of the separator 30. It will be appreciated that the width of each of the sealing flanges 32 and 35 is substantially the same as the width of the sealing areas at the margins of each electrolyte matrix 21.

Each of the cathode sealing flanges 32 cooperates with the associated overlapped portion of the plate 31 to define a channel or pocket in which is received a stack 40 of thin rectangular spring sheets 41, each of the sheets 41 having dimensions substantially the same as those of the corresponding flat portion 34 of the associated cathode sealing flange 32. These sheets 41 are secured to each other and to the associated flange 34 in a laminated structure by any suitable attachment means, such as gluing or spot welding, this laminated structure forming a cathode sealing rail, generally designated by the numeral 45. The cathode sealing rails 45 define therebetween an active region of an adjacent overlying fuel cell unit 20 in which is disposed the cathode 25, the cathode support plate 26 and the current collector 27 of that fuel cell unit 20.

Similarly, each of the anode sealing flanges 35 cooperates with the associated overlapped portion of the plate 31 to define a channel or pocket in which is received one of the stacks 40 of thin rectangular spring sheets 41, secured together in a laminated structure to form an anode sealing rail, generally designated by the numeral 50. The two anode sealing rails 50 cooperate to define therebetween an active region of the adjacent underlying fuel cell unit 20 in which is disposed the anode 22 of that fuel cell unit 20.

The combined nominal thicknesses of the spring sheets 41 of each stack 40, added to the thickness of the associated sealing flange flat portion 34 or 37, is substantially equal to the minimum desirable sealing rail thickness. However, the naturally occurring lack of flatness of fabricated thin metal sheets, when placed in a stack, provides a laminate which requires some force to flatten it to the sum of the individual layer thicknesses. This behavior provides resiliently compressible sealing rails. Each sealing rail 45 and 50 is designed to have a total thickness at rest and at ambient temperature which is substantially the same as the thickness of the components in the associated active region of the adjacent fuel cell unit 20. Thus, the thickness of the cathode sealing rails 45 is substantially the same as the combined thickness of the associated cathode 25, cathode support plate 26 and current collector 27, while the thickness of the anode sealing rails 50 is substantially the same as the thickness of the associated anode 22. In the preferred embodiment, it will be noted that the thickness of the cathode sealing rails 45 is slightly greater than the thickness of the anode sealing rails 50, but it will be appreciated that the thickness of the sealing rails 45 and 50 could be adjusted to any desired level depending upon the particular fuel cell electrode assemblies being used.

As can best be seen by FIGS. 2 and 3, each separator 30 separates the cathode assembly of one fuel cell unit 20 from the anode of an underlying adjacent fuel cell 20. Furthermore, it will be appreciated that the cathode sealing rails 45 are arranged to seal the closed side edges of the cathode 25 which extend parallel to the direction of oxidant gas flow through the current collector channels 28, while the anode sealing rails 50 are arranged respectively to seal the closed side edges of the anode 22 which run parallel to the direction of fuel gas flow through the channels 24. In particular, the flat portions 34 of the cathode sealing flanges 32 are respectively disposed in sealing engagement with the sealing regions on the electrolyte matrix 21 of the overlying fuel cell unit 20, while the flat portions 37 of the anode sealing flanges 35 are respectively disposed in sealing engagement with the sealing regions on the electrolyte matrix 21 of the underlying fuel cell unit 20.

It is a fundamental aspect of the present invention that the compressibility of the sealing rails 45 and 50 serves to accommodate tolerances in the thickness of the associated electrode assemblies and other fuel cell components. Thus, the thicknesses of the sealing rails 45 and 50 can adjust as the electrodes shrink or creep and will resiliently spring back as required during temperature changes to accommodate thermal expansions of the fuel cell components. If the degree of compressibility of the laminated spring sheets 41 is insufficient for the desired application, one or more of the spring sheets 41 may be mechanically worked, as at 42 (FIG. 5), to increase its deviation from flatness. In the preferred embodiment this deviation has been illustrated as having been achieved by corrugation or wave-forming of spring sheets 41, but it will be appreciated that it could be achieved by other methods such as shot peening, vapor blasting or grit blasting.

In a preferred form of the invention, each fuel cell 20 is a molten carbonate fuel cell. In this type of fuel cell the electrolyte matrix 21 may comprise an inert filler which is impregnated with a molten carbonate salt electrolyte. The anode 22 and cathode 25 may formed of porous nickel. The fuel gas may be a petroleum base gas or a gas derived from coal, and the oxidant may be air. The separator 30 may have a bi-metallic composition with the cathode side thereof formed of stainless steel and the anode side thereof formed of nickel. A suitable composition may be NI201/316SST with 0.004 inch nickel clad to 0.008 inch stainless steel. Also, the wet seal areas of the separator 30, comprising the outer surfaces of the sealing flanges 32 and 35 and the outer surfaces of the overlapped portions of the plate 31, must be aluminized to improve corrosion resistance in molten carbonate fuel cells. This aluminizing could be achieved by a high temperature (greater than 1600° F.) diffusion heat treatment. However, such high temperature heat treatment tends to severely distort the separator 30 and creates stacking problems.

Figure 6:
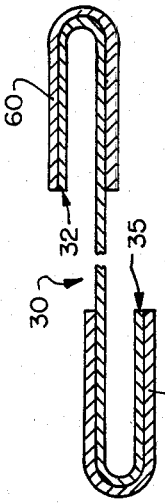
FIG. 6 is a view similar to FIG. 5, illustrating a preferred form of the separator plate of the present invention.

Accordingly, in the preferred form of the invention, the wet seal areas of the separator 30 are provided with an aluminide coating. This is accomplished by obtaining a commercially available aluminum clad stainless steel sheet. Thus, referring to FIG. 6, the aluminum cladding 60 may be in the areas indicated. The sheet is then bent to form the sealing flanges 32 and 35. Then the outermost layers of the aluminum cladding are anodized to convert the aluminum thereof to aluminum oxide. This will prevent the aluminum from melting during heatup in use when the separator 30 is installed in a fuel cell power plant. The unanodized aluminum layers near the stainless steel interface will diffuse into the stainless steel during power plant operation to form a diffusion bond. This approach minimizes distortion in the separator 30 and, at the same time, provides an aluminum oxide coated wet seal. A minimum of aluminum cladding, approximately 2–5 mils, will be sufficient for this process.

From the foregoing, it can be seen that there has been provided an improved fuel cell separator with compressible sealing rails which are adjustable with changes in thickness of the other fuel cell components in use, thereby to maintain the requisite sealing and electrical and thermal conductivity.

The embodiments of the invention in which an exclusive property or privilege is claimed are defined as follows:

1. A fuel cell separator comprising: a substantially flat, planar, gas-impermeable plate and gas-impermeable seal means along a peripheral edge of said plate projecting from the plane thereof, said seal means including adjustment means accommodating resilient compression of said seal means toward the plane of said plate.

2. The fuel cell separator of claim 1, wherein said plate is substantially rectangular in shape, said separator including two of said seal means respectively disposed along opposite side edges of said plate and projecting therefrom in the same direction.

3. The fuel cell separator of claim 1, wherein said seal means includes a flexible gas-impermeable seal member, and said adjustment means includes resiliently compressible means associated with said seal member.

4. The fuel cell separator of claim 1, wherein said seal means includes a seal flange on said plate along said peripheral edge thereof, said seal flange having a gas-impermeable first portion integral with said plate and extending therefrom toward the one end of the stack and a second portion integral with said first portion and overlapping said plate and spaced therefrom, said adjustment means including resilient means associated with said seal flange for maintaining a spacing between said second portion and said plate while accommodating movement of said second portion with respect to said plate for varying the spacing therebetween.

5. The fuel cell separator of claim 4, wherein said seal flange is unitary with said plate and comprises a margin of said plate folded back upon itself.

6. The fuel cell separator of claim 4, wherein said resilient means is discrete from said seal flange.

7. The fuel cell separator of claim 1, wherein, said seal means comprises first seal means, and further including gas-impermeable seal means along a second peripheral edge of said plate projecting from the plane thereof in the opposite direction from said first seal means, said second seal means including second adjustment means accommodating resilient compression of said second seal means toward the plane of said plate.

8. The fuel cell separator of claim 7, wherein said plate is substantially rectangular in shape, said separator including two of said first seal means respectively disposed along opposite side edges of said plate, and two of said second seal means respectively disposed along the other side edges of said plate.

9. A fuel cell separator for separating two adjacent fuel cells in a stack of such cells, wherein each cell has a reactive region and a seal seat therealong, said separator comprising: a substantially flat, gas-impermeable plate disposed between the adjacent cells; a seal flange on said plate along a peripheral edge thereof, said seal flange including a gas-impermeable first portion integral with said plate and extending therefrom toward one end of the stack and a second portion integral with said first portion and overlapping said plate and spaced therefrom, said seal flange cooperating with said plate and with the seal seat of one of the adjacent cells for providing a gas-impermeable seal for the reactive region of the one cell along said peripheral edge, said seal flange cooperating with said plate to define an elongated channel along said peripheral edge; and a resiliently compressible stack of sheets disposed in and substantially filling said channel, compression of said stack of sheets accommodating slight movement of said second portion with respect to said plate for varying the spacing therebetween.

10. The fuel cell separator of claim 9, wherein said stack of sheets is secured to said seal flange and to said plate and adjacent ones of said sheets are secured together.

11. The fuel cell separator of claim 9, wherein each of said sheets is generally flat and has a nominal datum plane disposed substantially parallel to said plate, each of said sheets having resilient portions which project slightly above or below said datum plane and are resiliently deflectable toward the datum plane for flattening the sheet thereby to provide the compressibility of the stack of sheets.

12. The fuel cell separator of claim 11, wherein each of said sheets is a substantially flat fabricated thin metal sheet, each of said sheets in its as-fabricated condition having slight deviations from absolute flatness which deviations comprise said resilient portions.

13. The fuel cell separator of claim 12, wherein at least one of said sheets has additional resilient portions formed therein by mechanical working.

14. The fuel cell separator of claim 9, wherein said plate is substantially rectangular in shape, said separator including two of said seal flanges respectively disposed along opposite side edges of said plate and projecting therefrom toward the one end of the stack for sealing the reactive region of the one cell along opposite sides thereof, and two of said resiliently compressible stacks of sheets respectively disposed in and substantially filling the channels formed by said seal flanges.

15. The fuel cell separator of claim 14, and further including two second seal flanges respectively disposed along the other two sides of said plate and projecting toward the other end of the stack of cells, and two resiliently compressible stacks of sheets respectively disposed in and substantially filling the channels formed by said second seal flanges.

16. The fuel cell separator of claim 9, wherein said seal flange is unitary with said plate and comprises a marginal edge of said plate folded back upon itself.

17. A fuel cell separator for separating two adjacent fuel cells in a stack of such cells, wherein each cell is generally rectangular in shape and includes first and second reactive regions spaced apart by an electrolyte-retaining matrix having a seal seat along the margins thereof, and wherein the first and second reactive regions respectively communicate along adjacent sides of the cell with first and second reactant gas manifolds, said separator comprising: a substantially flat, rectangular, gas-impermeable plate disposed between the adjacent cells and having side edges respectively disposed substantially parallel to the sides of the adjacent cells; first and second seal flanges respectively disposed on adjacent edges of said plate, each of said seal flanges being unitary with said plate and comprising a margin of said plate folded back upon itself with said first and second flanges respectively folded over opposite surfaces of said plate, the portion of each of said flanges overlapping said plate being spaced therefrom, said first seal flange extending toward one end of the stack and cooperating with said plate and with the seal seat of one of the adjacent cells for providing a gas-impermeable seal between the first reactive region of the one cell and the second reactant gas manifold, said second seal flange extending toward the opposite end of the stack and cooperating with said plate and with the seal seat of the other of the adjacent cells for providing a gas-impermeable seal between the second reactive region of the other cell and the first reactant gas manifold; and two resilient means respectively associated with said seal flanges for maintaining a spacing between said overlapping portions and said plate while accommodating slight movement of said overlapping portions with respect to said plate for varying the spacing therebetween.

18. The fuel cell separator of claim 17, wherein said resilient means is discrete from said seal flanges.

19. The fuel cell separator of claim 18, wherein each of said seal flanges cooperates with said plate to define an elongated channel along the associated side edge thereof, each of said seal means comprising a resiliently compressible stack of sheets disposed in and substantially filling said channel, compression of said stack of sheets accommodating slight movement of said overlapping portion of said flange with respect to said plate for varying the spacing therebetween.

20. The fuel cell separator of claim 17, wherein said plate includes two of said first seal flanges respectively disposed along opposite side edges of said plate and two of said second seal flanges respectively disposed along the other side edges of said plate.

* * * * *